United States Patent
McMullin et al.

(10) Patent No.: US 12,175,743 B2
(45) Date of Patent: Dec. 24, 2024

(54) FOREIGN OBJECT DEBRIS MOVEMENT SIMULATION

(71) Applicant: The Boeing Company, Chicago, IL (US)

(72) Inventors: Alex Aaron McMullin, Athens, AL (US); Richard Joel Thompson, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 375 days.

(21) Appl. No.: 17/452,557

(22) Filed: Oct. 27, 2021

(65) Prior Publication Data
US 2023/0130496 A1   Apr. 27, 2023

(51) Int. Cl.
| G06V 20/17 | (2022.01) |
| G06F 18/214 | (2023.01) |
| G06F 18/2415 | (2023.01) |
| G06V 20/64 | (2022.01) |

(52) U.S. Cl.
CPC ............ *G06V 20/17* (2022.01); *G06F 18/214* (2023.01); *G06F 18/2415* (2023.01); *G06V 20/64* (2022.01)

(58) Field of Classification Search
CPC ... G06F 18/2415; G06F 18/214; G06V 20/17; G06V 20/64
See application file for complete search history.

(56) References Cited

U.S. PATENT DOCUMENTS

| 7,345,877 B2 | 3/2008 | Asfia et al. |
| 10,380,278 B2 | 8/2019 | Thompson et al. |
| 10,937,006 B2 | 3/2021 | Engelbart et al. |
| 2008/0234994 A1 | 9/2008 | Goebel et al. |

(Continued)

FOREIGN PATENT DOCUMENTS

| CN | 112730205 A | 4/2021 |
| CN | 113588528 A | 11/2021 |

(Continued)

OTHER PUBLICATIONS

"FAA Foreign Object Debris Program," Federal Aviation Administration, Available Online at https://www.faa.gov/airports/airport_safety/fod/, Available as Early as Jul. 18, 2012, 1 page.

(Continued)

*Primary Examiner* — Margaret G Mastrodonato
(74) *Attorney, Agent, or Firm* — Alleman Hall & Tuttle LLP

(57) ABSTRACT

Examples are disclosed that relate to computer-predicting behavior of foreign object debris (FOD) in a machine. In one example, a geometric computer model of the machine is recognized. FOD initial conditions within the geometric computer model of the machine are recognized. A movement schedule for the geometric computer model of the machine is recognized. A movement trajectory of a FOD from a starting position consistent with the FOD initial conditions throughout the geometric computer model of the machine is simulated based at least on the movement schedule for the geometric computer model of the machine. Simulation data detailing a likelihood that the FOD will come to rest at a location within the geometric computer model of the machine based on the simulated movement trajectory is output.

20 Claims, 6 Drawing Sheets

(56) References Cited

U.S. PATENT DOCUMENTS

| | | | |
|---|---|---|---|
| 2009/0058427 | A1 | 3/2009 | Materer et al. |
| 2014/0278148 | A1 | 9/2014 | Ziegel et al. |
| 2015/0268152 | A1 | 9/2015 | Friedersdorf et al. |
| 2017/0136757 | A1 | 5/2017 | Georgeson et al. |
| 2017/0205333 | A1 | 7/2017 | Friedersdorf et al. |
| 2019/0049987 | A1* | 2/2019 | Djuric .............. G06N 3/08 |
| 2020/0012871 | A1* | 1/2020 | Lee .............. B60N 2/0224 |
| 2020/0272704 | A1* | 8/2020 | Laverty .............. G06F 30/23 |
| 2021/0056365 | A1* | 2/2021 | Sivan .............. G06V 20/58 |
| 2021/0072144 | A1 | 3/2021 | Omoda et al. |
| 2021/0388579 | A1* | 12/2021 | Kennedy .............. B60R 1/31 |
| 2022/0164494 | A1 | 5/2022 | Thompson et al. |
| 2022/0164681 | A1 | 5/2022 | Aurongzeb et al. |

FOREIGN PATENT DOCUMENTS

| | | |
|---|---|---|
| CN | 113591385 A | 11/2021 |
| FR | 2917520 A1 | 12/2008 |
| JP | 2004252781 A | 9/2004 |
| WO | 2020162098 A1 | 8/2020 |
| WO | 2021181369 A1 | 9/2021 |

OTHER PUBLICATIONS

Moran, R., "What is FOD?" Risk Management Magazine, Available Online at https://safety.army.mil/MEDIA/Risk-Management-Magazine/ArtMID/7428/ArticleID/6199/What-is-FOD, Jan. 20, 2019, 4 pages.

Bellinger, N.C. et al., "Corrosion Pillowing Stresses in Fuselage Lap Joints," AIAA Journal, vol. 35, No. 2, Feb. 1997, 4 pages.

Liao, M. et al., "Corrosion Risk Assessment of Aircraft Structures," Journal of ASTM International, vol. 1, No. 8, Sep. 2004, 11 pages.

Cole, I.S. et al., "Development of a Sensor-Based Learning Approach to Prognostics in Intelligent Vehicle Health Monitoring," Proceedings of the 2008 International Conference on Prognostics and Health Management, Oct. 6, 2008, Denver, CO, 7 pages.

Hickman, G.A. et al., "Application of Smart Structures to Aircraft Health Monitoring," Proceedings of the First Joint U. S./Japan Conference on Adaptive Structures, Nov. 13, 1990, Maui, HI, 20 pages.

Komorowski, J.P. et al., "Research in corrosion of ageing transport aircraft structures at Smpl," Casi Journal : IAR 50th Anniversary Edition, vol. 47, No. 3, Sep. 2001, 24 pages.

Boyer, R.R., "New Titanium Applications on the Boeing 777 Airplane," JOM, vol. 44, May 1992, 3 pages.

Froes, F.H., "Titanium—Physical Metallurgy Processing and Applications," ASM International, Jan. 1, 2015, 11 pages.

Macha, E.N. et al., "Development of a Methodology to Predict Atmospheric Corrosion Severity Using Corrosion Sensor Technologies," Proceedings of the NACE International Corrosion Conference & Expo 2019 (Corrosion 2019), Mar. 24, 2019, Nashville, TN, 14 pages.

Boswell-Koller, C.N. et al., "Statistical Analysis of Environmental Parameters: Correlations between Time of Wetness and Corrosion Severity," Corrosion, vol. 75, No. 5, May 2019, 7 pages.

Adey, R. et al., "Predicting Cumulative Galvanic Corrosion Damage in Aircraft Structures using Environmental Exposure Measurements," Proceedings of the NACE International Corrosion Conference & Expo 2019 (Corrosion 2019), Mar. 24, 2019, Nashville, TN, 13 pages.

European Patent Office, Extended European Search Report Issued in Application No. 23188055.0, Jan. 3, 2024, 9 pages.

European Patent Office, Extended European Search Report Issued in Application No. 24172080.4, Sep. 18, 2024, 11 pages.

Song, X. et al., "Multi-factor mining and corrosion rate prediction model construction of carbon steel under dynamic atmospheric corrosion environment," Engineering Failure Analysis, vol. 134, Apr. 2022, 14 pages.

United States Patent and Trademark Office, Office Action Issued in U.S. Appl. No. 17/462,928, filed Sep. 26, 2024, 86 pages.

Palani, S. et al., "Modeling Galvanic Corrosion Behavior of Carbon Fiber Composite/AL 7050 Joints Under Extended Exposures," Proceedings of the 2017 Department of Defense—Allied nations Technical Corrosion Conference, Aug. 7, 2017, Brimingham, Alabama, 8 pages.

Rinaldi, G. et al., "Corrosion Sensor Development for Condition-Based Maintenance of Aircraft," International Journal of Aerospace Engineering, vol. 2012, Jun. 27, 2012, 12 pages.

Sarkar, S. et al., "Stochastic reduced order models for uncertainty quantification of intergranular corrosion rates," Corrosion Science, vol. 80, Mar. 2014, 12 pages.

Williams, K.S. et al., "Galvanic Corrosion Risk Mapping using Coupled Empirical and Multiphysics Corrosion Models," Proceedings of the 2017 Department of Defense—Allied nations Technical Corrosion Conference, Aug. 7, 2017, Brimingham, Alabama, 11 pages.

* cited by examiner

FOREIGN OBJECT DEBRIS MOVEMENT SIMULATION

FIELD

The present disclosure relates generally to finding foreign object debris (FOD), and more specifically, to computer simulating behavior of foreign object debris (FOD) within a geometric computer model of a machine.

BACKGROUND

Foreign object debris (FOD) may be classified as any object that is positioned at an unintended location within a machine. The presence of FOD is undesirable. A variety of inspection methods may be employed to detect FOD. For example, FOD may be detected using visual inspections and X-ray inspections. Further, a variety of different tools may be employed to detect FOD. For example, sweepers, vacuums, and magnets may be used to collect FOD.

SUMMARY

Examples are disclosed that relate to computer-predicting behavior of foreign object debris (FOD) in a machine. In one example, a geometric computer model of the machine is recognized. FOD initial conditions within the geometric computer model of the machine are recognized. A movement schedule for the geometric computer model of the machine is recognized. A movement trajectory of a FOD from a starting position consistent with the FOD initial conditions throughout the geometric computer model of the machine is simulated based at least on the movement schedule for the geometric computer model of the machine. Simulation data detailing a likelihood that the FOD will come to rest at a location within the geometric computer model of the machine based on the simulated movement trajectory is output.

The features, functions, and advantages that have been discussed can be achieved independently in various embodiments or may be combined in yet other embodiments, further details of which can be seen with reference to the following description and drawings.

DETAILED DESCRIPTION

A machine may be manually inspected to detect and remove foreign object debris (FOD) from the machine. In one example, a "brute force" approach for FOD detection involves manually checking practically all areas within a machine for FOD. Such a brute force approach consumes significant time and resources. In some examples, such a brute force approach can take multiple human FOD inspectors days or even weeks to manually detect FOD in a machine depending on the size and complexity of the machine, and may rely on the skill of the inspector (e.g., familiarity with the machine).

To address the above and other issues, examples are disclosed that relate to computer-predicting behavior of foreign object debris (FOD) in a machine. In one example, a movement trajectory of a FOD within a geometric computer model of a machine is computer simulated based on a movement schedule for the geometric computer model of the machine.

In some examples, a movement trajectory of a FOD may be computer simulated based on a single instance of FOD initial conditions and a single movement schedule to produce simulation data detailing a likelihood that the FOD will come to rest at one or more locations within the geometric computer model of the machine. In other examples, a plurality of computer simulations may be performed using different instances of FOD initial conditions and/or different movement schedules. In this case, the simulation data output from the plurality of computer simulations may be aggregated to form a generalized characterization of FOD behavior.

Simulation data output from the computer simulation(s) can be used for targeted inspection of FOD in a machine by first inspecting the location(s) identified as having the highest likelihood of the FOD coming to rest ahead of other locations having lower likelihoods. Such targeted inspection may be more time and resource efficient than prior brute force FOD inspection approaches. Further, such predictive capability does not impose any additional risk in introducing new FOD into the machine. In contrast, prior FOD inspection solutions often would use devices or tools (e.g., sweepers, vacuums, magnets) that require being inserted into the machine and would potentially introduce new FOD to the machine.

Figure 1:
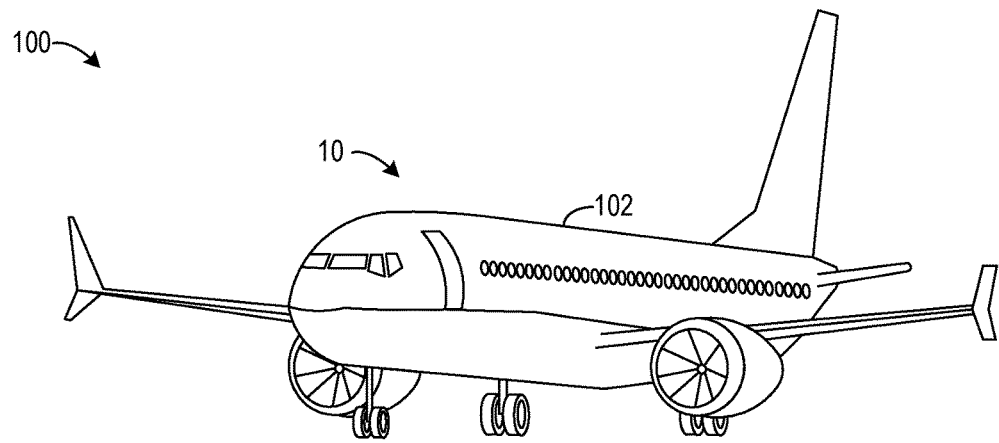
FIG. 1 shows an example geometric computer model of an aircraft that may be used to predict the behavior of foreign object debris (FOD) within the aircraft.
Figure 2:
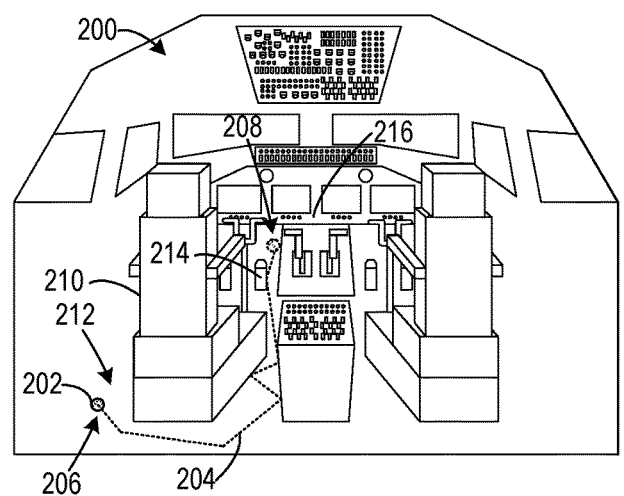
FIG. 2 shows an example geometric computer model of a cockpit of the aircraft shown in FIG. 1.

The herein-described approach for predicting behavior of FOD in a machine is performed through computer-modeling of the machine and the FOD. Specifically, movement of the machine and the effects of such movement on the FOD are computer simulated to estimate a location of the FOD in the machine. Such an approach is applicable to any suitable type of machine. As one example, FIGS. 1 and 2 show aspects of a geometric computer model of a machine 10 embodied in the illustrated example as an aircraft 100. The geometric computer model of the aircraft 100 can take any suitable form. For example, the geometric computer model may include a point cloud, a wireframe, a polygon mesh, a curve model, or other computer representation that is compatible with a physics engine or other computer simulation software. Other machine types are contemplated, such as manned or unmanned vehicles (e.g., cars, ships, spacecraft, drones, and the like), tools, computers, etc. Note that the concepts of simulating movement of a machine and the effects of such movement on FOD are herein described in the context of the aircraft 100. However, these concepts are broadly applicable to any suitable type of machine that may be computer-modeled in any suitable manner.

FIG. 1 shows an exterior view of the machine 10 embodied as the aircraft 100. The aircraft 100 includes myriad modeled objects in the form of aviation components. Non-limiting examples include, but are not limited to, wings, flaps, engines, doors, windows, landing gear, and/or a tail among other geometric computer-modeled components on an exterior 102 of the aircraft 100. Additionally, aviation components can be modeled within an interior of the aircraft including a cockpit shown in FIG. 2 and other aspects not shown, such as a cabin, galley, lavatory, and cargo area.

The geometric computer model of the aircraft 100 can include any suitable number of modeled aviation components. In some examples, the number of modeled aviation components included in the geometric computer model of the aircraft 100 are in the tens of thousands, hundreds of thousands, or more. In other examples, the geometric computer model of the aircraft 100 has a less complex geometry having fewer modeled aviation components or simplified representations of such aviation components (e.g., spline or parametric representations). In some examples, the geometric computer model of the aircraft 100 includes a specific subsection of the aircraft such as the interior of the cockpit 200 with the salient features being modeled, such as the seats, consoles, pedals, bulkhead, etc.

FIG. 2 shows a view of a geometric computer model of a cockpit 200 of the aircraft 100 shown in FIG. 1. The geometric computer model of the cockpit 200 can take any suitable form. For example, the geometric computer model may include a point cloud, a wireframe, a polygon mesh, a curve model, or other computer representation that is compatible with a physics engine or other computer simulation software.

The geometric computer model of the cockpit 200 includes modeled aviation components including, but not limited to, gauges, monitors, pedals, switches, yoke, seats, and/or windows among other modeled aviation components. In other examples, the geometric computer model of the cockpit 200 may have a less complex geometry having fewer modeled aviation components or simplified representations of such aviation components.

A geometric computer model of a FOD 202 is located within the geometric computer model of the cockpit 200. The geometric computer model of the FOD 202 can take any suitable form. Example geometric representations of the FOD include, but are not limited to, a point particle representation, a rigid body representation, a geometric representation, or another representation that is compatible with the geometric computer model of the aircraft 100.

The FOD may come to reside in the cockpit 200 based on any suitable circumstance. As one example, the FOD is introduced to the cockpit 200 of the aircraft by a pilot or other member of a flight crew. As another example, the FOD is introduced to the cockpit 200 of the aircraft by a member of a cleaning crew or a maintenance crew. As yet another example, the FOD is introduced by a passenger of the aircraft. As still yet another example, the FOD is introduced to the cockpit 200 of the aircraft through a ventilation system or an open window of the cockpit 200.

The FOD's position within the cockpit 200 is based on conditions specified for a dynamic computer simulation. For example, initial conditions may be specified for the FOD 202 at the beginning of a computer simulation. Non-limiting conditions that may be specified for the FOD 202 include an initial shape, an initial mass, an initial position, and an initial velocity that affect movement of the FOD. The conditions of the FOD 202 may be set to different parameters for different computer simulations.

The dynamic computer simulation is based on a specified movement schedule of the aircraft 100 (and correspondingly the cockpit 200). In one example, the movement schedule of the aircraft 100 corresponds to a flight path of the aircraft 100 over the course of a flight. For example, the flight path may include all of the movements of the aircraft 100 that occur during different phases of flight (e.g., takeoff, climbing, cruising, descent, and landing). Further, the movement schedule may include dynamic movements within these phases (e.g., banking turns, barrel rolls, loops, spins). In some examples, the movement schedule is computer generated. In other examples, the movement schedule is derived from sensor data from an actual flight of a real-world aircraft.

The specified movement schedule of the aircraft 100 is used to computer simulate a movement trajectory 204 of the FOD 202 from a starting position 206 that is consistent with the initial conditions. The movement trajectory 204 tracks movement of the FOD 202 throughout the cockpit 200 to a final resting position 208. In the illustrated example, the FOD 202 starts behind a seat 210 of the floorboard 212 and the computer simulation estimates that the final resting position of the FOD 202 is most likely forward of the seat 210 on the floorboard 212 by the pedals 214 and underneath the console 216.

In some cases, there can be uncertainty about the final resting position 208 based on the computer simulation. In such cases, the computer simulation outputs simulation data detailing a likelihood that the FOD will come to rest at each of two or more different locations within the geometric computer model of the machine based on the simulated movement trajectory. For example, the simulation data includes a probability distribution of different locations for the FOD 202 to reside within the cockpit 200 based on the movement schedule of the aircraft 100. In some examples, the simulation data includes a heat map of the cockpit 200 that visualizes the likelihood that the FOD will come to rest at the different locations.

For example, such simulation data can be used by a human inspector to intelligently inspect different locations in a real-world version of the cockpit 200 having the highest likelihood of having FOD based on the simulation data output from various computer simulations. Such a FOD inspection approach is more efficient than an unintelligent brute force FOD inspection approach.

The herein-described computer-implemented approach for predicting behavior of FOD in a machine is broadly applicable to any suitable type of machine in any suitable type of application. For ease of explanation, the discussion of such an approach is limited to the context of a machine embodied as an aircraft, but the concepts are not limited to aircraft and/or aviation applications. Other applications are contemplated such as but not limited to, nautical environments, cruise ships, cargo vehicles, passenger vehicles, spacecraft, satellites, and the like.

Additionally, the concepts described herein are broadly applicable to machines that are not self-propelled. For example, the concepts described herein are broadly applicable to machines that are carried by users, such as portable devices (e.g., laptop computer, smartphone). As another example, the concepts described herein are broadly applicable to predict behavior of FOD in any suitable type of machine during a manufacture process of the machine. For example, FOD behavior in a machine may be predicted as the machine moves along an assembly line and is manipulated by robots or human workers as part of the manufacturing process.

Figure 3:
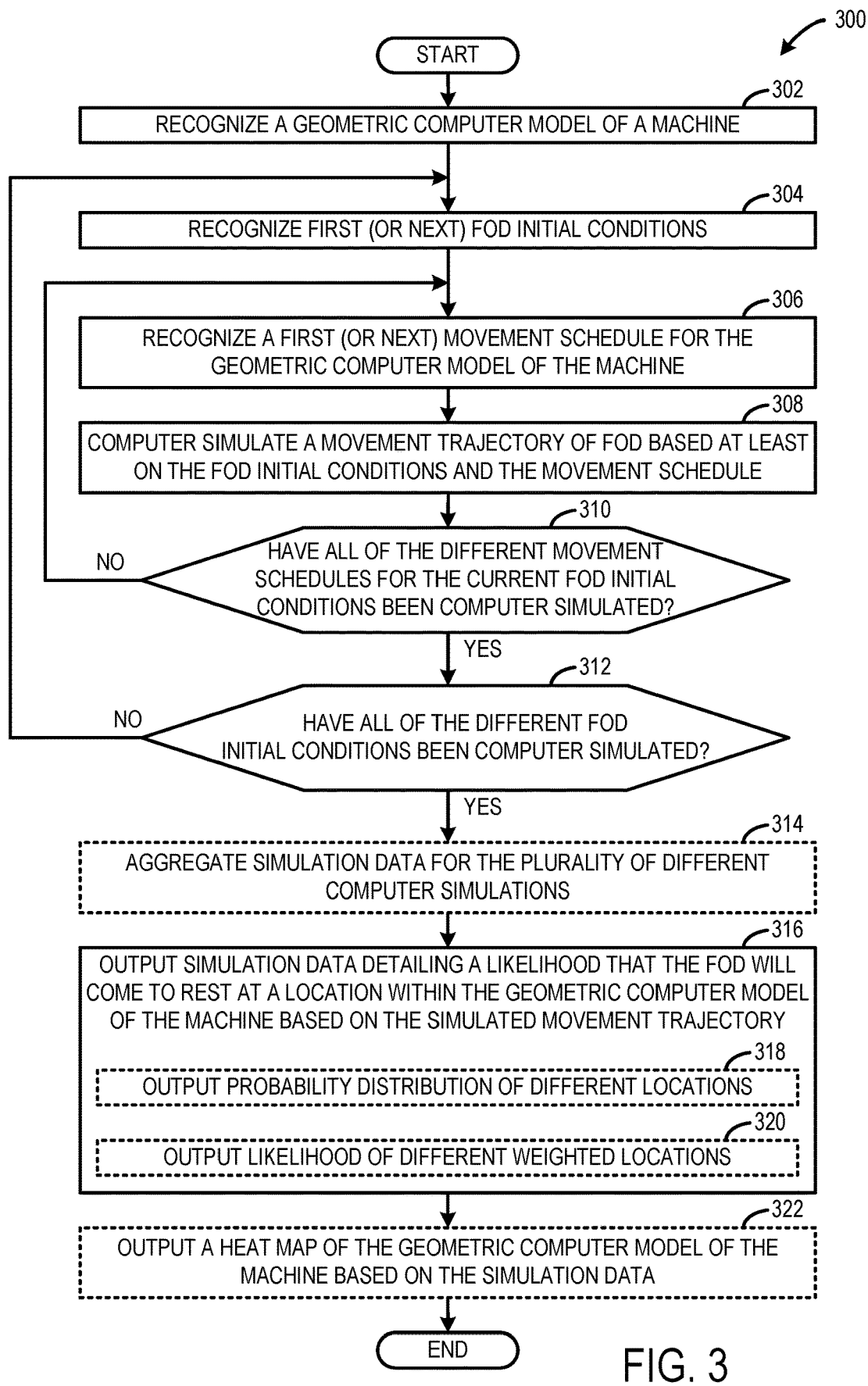
FIG. 3 is a flowchart of an example computer-implemented method for predicting behavior of FOD in a machine.

FIG. 3 shows an example computer-implemented method 300 for predicting behavior of FOD in a machine. For example, the method 300 can be performed by a computing system 900 shown in FIG. 9, or generally by any suitable computer or a plurality of computers (e.g., a cloud computing system) having software/hardware specifications suitable to perform computer analysis of modeled machines. Note that steps of the method 300 that are indicated in dotted lines are optional and may be skipped or omitted in some examples.

At 302, the method 300 includes recognizing a geometric computer model of a machine. The geometric computer model of the machine can represent an entirety of the machine or some simplified subset of the machine in which FOD could be located. The geometric computer model of the machine represents a real-world version of the machine with any suitable degree of detail. For example, the geometric computer model may include spline, parametric, computer-aided design (CAD) geometry, or another form of geometry representing the machine. In the example, of the machine 10 embodied as the aircraft 100 shown in FIGS. 1 and 2, the geometric computer model includes the entire airframe with subcomponents, such as the interior of the cockpit 200 shown in FIG. 2 with the salient features (seat, consoles, bulkhead, canopy, etc.).

As used herein, the term "recognize" or "recognizing" includes self-identifying, receiving from an external source, accessing from an external source, or otherwise readying the geometric computer model for use in the computer simulation. In some examples, recognizing the geometric computer model includes loading the geometric computer model into computer memory for computer simulation. In some examples, recognizing the geometric computer model includes receiving, via user input, a selection of the geometric computer model from a plurality of different geometric computer models stored in computer memory.

At 304, the method 300 includes recognizing a first instance of FOD initial conditions. The first instance of the FOD initial conditions are conditions of the FOD at the beginning of the first computer simulation. Note that different instances of the FOD initial conditions may include different condition parameters and correspond to different computer simulations. For example, the FOD initial conditions—i.e., condition parameters may include an initial shape of the FOD, an initial mass of the FOD, an initial position of the FOD, and/or an initial velocity of the FOD. In some examples, the initial shape of the FOD includes a point particle representation, a rigid body representation, a geometric shape representation, or another type of representation.

As used herein, the term "recognize" or "recognizing" includes self-identifying, receiving from an external source, accessing from an external source, or otherwise readying the FOD initial conditions for use in the computer simulation. In some examples, recognizing the FOD initial conditions includes loading the FOD initial conditions into computer memory for computer simulation. In some examples, recognizing the FOD initial conditions includes receiving, via user input, the FOD initial conditions. In some such examples, a user may select an instance of FOD initial conditions from a plurality of different instances of FOD initial conditions stored in computer memory.

In some implementations, a plurality of different instances of FOD initial conditions may be varied on simulation-to-simulation basis in order to explore different FOD behavior scenarios. For example, the plurality of different initial conditions may include a plurality of different starting positions of the FOD in the machine. As another example, a size of the FOD may vary from simulation to simulation. Any suitable initial condition (or other attribute) of the FOD may be changed from simulation to simulation. In some examples, the method 300 may include iterating through a series of computer simulations with one or more initial conditions of the FOD being changed for each computer simulation.

At 306, the method 300 includes recognizing a movement schedule for the geometric computer model of the machine. The movement schedule includes a series of physical movements of the machine over a time duration that generates or contributes to forces that are applied to the FOD causing the FOD to move within the machine. The movement schedule can be divided into a sequence of time steps that are used to mark a position and/or orientation (e.g., in 6 degrees of freedom (6DOF)) of the geometric computer model of the machine. Note that the simulated FOD experiences simulated movement as a result of the simulated movement of the simulated machine and simulated forces applied to the simulated FOD by the computer simulation. In other words, the cause is simulated movement of the simulated machine, and the effect is the resulting simulated movement of the simulated FOD.

In some cases, the movement schedule specifies that different components of the machine move or change position at given times during the time duration. Referring to the example of the aircraft, the movement schedule may specify a point in time when a door opens or closes, when a landing gear extends or retracts, when the flaps move up and down, for example.

In some examples, the movement schedule is not based on an actual, already-observed movement of a corresponding real world machine. In some such examples, this type of imagined movement schedule is user-generated. In other such examples, this type of imagined movement schedule is computer-generated. In still other examples, the movement schedule is generated based on sensor data from actual movement of a corresponding real-world machine.

Returning to the aircraft example, the sensor data includes flight data used from actual flight tests of a real-world aircraft. For example, flight data may include, but is not limited to, orientation, forces, and moments in 6 degrees of freedom, acceleration, airspeed, magnetic heading, control-column position, rudder-pedal position, control, wheel position, horizontal stabilizer position, and other flight data. Any suitable sensor data may be used to generate a movement schedule for a geometric computer model of a machine.

As used herein, the term "recognize" or "recognizing" includes self-identifying, receiving from an external source, accessing from an external source, or otherwise readying the movement schedule for use in the computer simulation. In some examples, recognizing the movement schedule includes loading the movement schedule into computer memory for computer simulation. In some examples, recognizing the movement schedule includes receiving, via user input, the movement schedule. In some such examples, a user may select a movement schedule from a plurality of different movement schedules stored in computer memory.

At 308, the method 300 includes computer simulating a movement trajectory of the FOD from a starting position consistent with the FOD initial conditions throughout the geometric computer model of the machine based at least on the movement schedule. The movement trajectory of the FOD may be computer simulated in any suitable manner using any suitable computer simulation approach.

In some examples, the movement trajectory of the FOD is computer simulated based on a physics engine. A physics engine provides a simulation of rigid body dynamics (including collision detection), soft body dynamics, fluid dynamics, etc. as the geometric computer model and computer model of the FOD experience forces in accordance with the movement schedule.

In other examples, the movement trajectory of the FOD is computer simulated based on a machine-learning model previously trained using machine motion training data. Returning to the example of the aircraft, such machine motion training data can include flight data and/or other sensor data collected from flights of various aircraft. In one example, the machine-learning model is trained on ground truth initial conditions of a FOD and ground truth movement schedules of an aircraft along with corresponding labelled rest locations.

Figure 4:
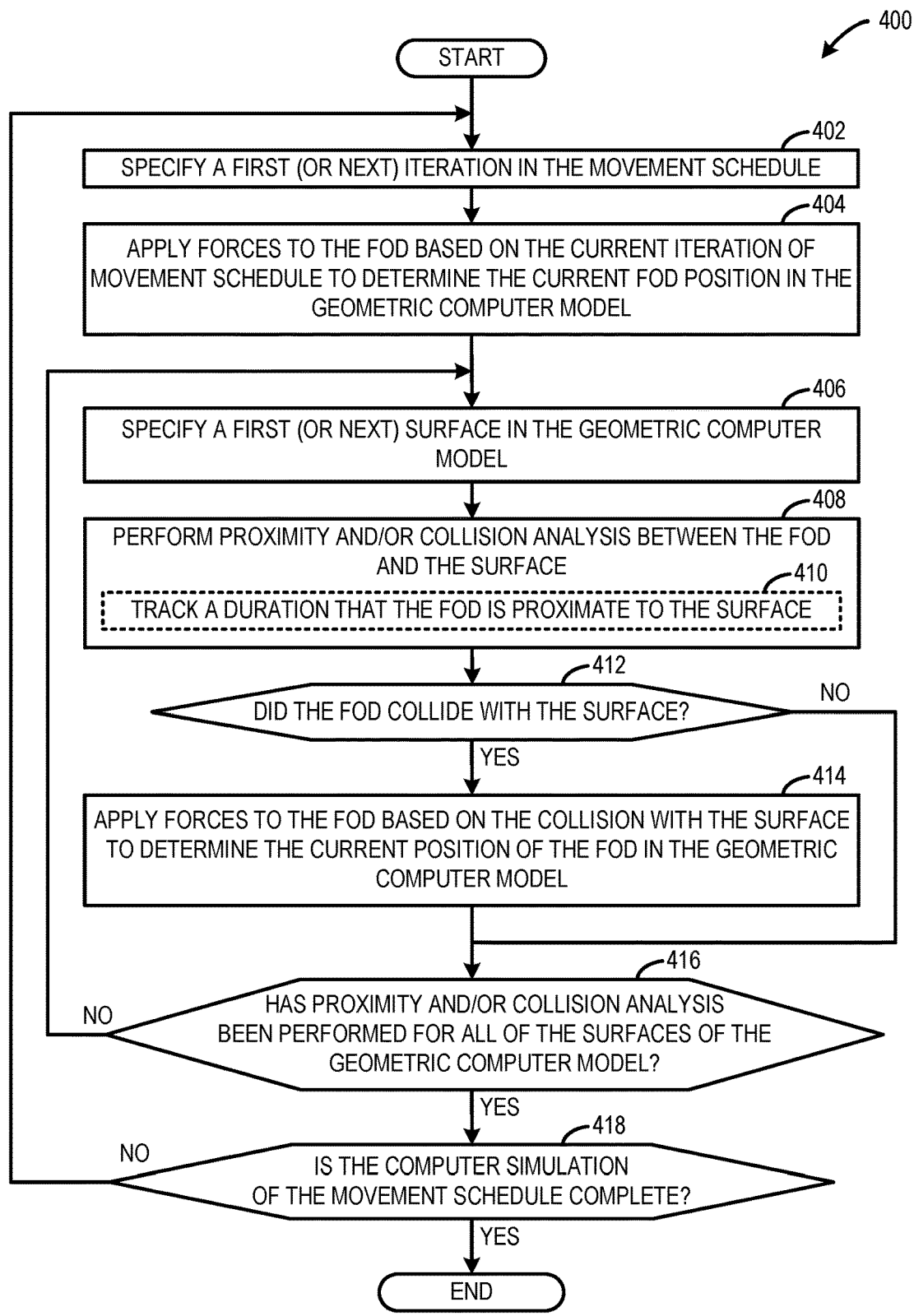
FIG. 4 is a flowchart of an example method for computer simulating a movement trajectory of a FOD in a machine based on a movement schedule for a geometric computer model the machine.

FIG. 4 shows an example method 400 for computer simulating a movement trajectory of a FOD in a machine based on a movement schedule for a geometric computer model the machine. For example, the method 400 can be performed by the computing system 900 shown in FIG. 9, or generally by any suitable computer or a plurality of computers (e.g., a cloud computing system) as part of the method 300 shown in FIG. 3. In one example, a physics engine similar to a high-performance 3D game engine may be used.

At 402, the method 400 includes specifying a first iteration (or time step) of the movement schedule. The first iteration of the movement schedule defines the initial conditions of the geometric computer model of the machine. For example, the initial conditions of the geometric computer model of the machine may include a starting position and/or orientation, a velocity, and other parameters of the geometric computer model of the machine.

At 404, the method 400 includes applying forces to the FOD based on the current iteration of the movement schedule to determine movement from a starting iteration position of the FOD in the geometric computer model to an ending iteration position of the FOD in the geometric computer model.

In one example where the computer simulation is a first-principles physics dynamic simulation, the force acting on the FOD and the geometry of the model is applied to determine where the FOD moves within the time-step. For example, if the geometry of the model were under any rotational forces due to the geometry accelerating (linearly or rotationally), then these effects would also be calculated and applied to the FOD to determine the position of the FOD (e.g., based on Newtonian physics).

When determining the position of the FOD for the current iteration of the movement schedule, proximity/collision analysis can be performed to determine if the FOD is proximate to or has collided with any surface of the geometric computer model of the machine for the current iteration of the movement schedule. In particular, at 406, the method 400 includes specifying a first surface in the geometric computer model. At 408, the method includes performing proximity and/or collision analysis between the FOD and the specified surface.

Any suitable proximity and/or collision analysis can be performed. In one example, a geometric intersection is performed between the specified surface and the FOD to determine if the FOD is effectively touching or is in close proximity to the specified surface. The geometric intersection can be calculated using any suitable distance metrics including, but not limited to, L1, Euclidean, or Minkowski distance metrics.

In some implementations, at 410, the method 400 optionally may include, as part of the proximity and/or collision analysis, tracking a duration that the FOD is proximate (e.g., within a threshold distance) to the specified surface based on the movement schedule. Such tracking data may be used to determine a likelihood of a location of the FOD at the end of the computer simulation. In one example, the likelihood is proportional to a cumulative duration the FOD is within a threshold distance of a location/surface.

At 412, it is determined if the FOD collided with the specified surface. If the FOD collided with the specified surface, then the method 400 moves to 414. Otherwise, the method 400 moves to 416.

At 414, the method 400 includes applying forces to the FOD based on the collision with the surface to determine the current position of the FOD in the geometric computer model. In some examples, collisions may be enforced by the physics engine or other simulation approach and forces from the simulated collision may be used to affect downstream motion of the FOD. For example, if the FOD collided with the specified surface, then the force of the collision on the specified surface can be used to calculate the reflection velocity of the FOD. Further, any additional forces due to the FOD colliding with the surface can be applied, such as spin or other forces/physical effects.

At 416, the method 400 includes determining if proximity and/or collision analysis has been performed for all of the surfaces of the geometric computer model for which such analysis is desired. If proximity and/or collision analysis has been performed for all such surfaces of the geometric computer model of the machine, then the method 400 moves to 418. Otherwise, the method 400 returns to 406 and a next surface of the geometric computer model is specified for proximity and/or collision analysis.

At 418, the method 400 includes determining if the computer simulation of the movement schedule is complete. If the computer simulation of the movement schedule is complete, then the method 400 ends and operation continues within the method 300 by moving to 310. Otherwise, the computer simulation is not complete, the method 400 returns to 402, and a next iteration of the movement schedule is specified for computer simulation. The method 400 continues in this manner for all iterations of the movement schedule to simulate the movement trajectory of the FOD in the geometric computer model of the machine. Iterations of any duration may be used. In some examples, these iterations may be discrete timesteps (e.g., analogous to rows in a spreadsheet). In some examples, the iterations may be an arbitrarily selected time window, or instance, produced by a physics engine utilizing continuous kinematic/dynamic functions to calculate force, position, velocity, acceleration, etc.

The method 400 is provided as a non-limiting example of an approach for computer simulating a movement trajectory of FOD in a geometric computer model of a machine. The movement trajectory of FOD may be computer simulated in any suitable manner using any suitable approach.

Figure 5:
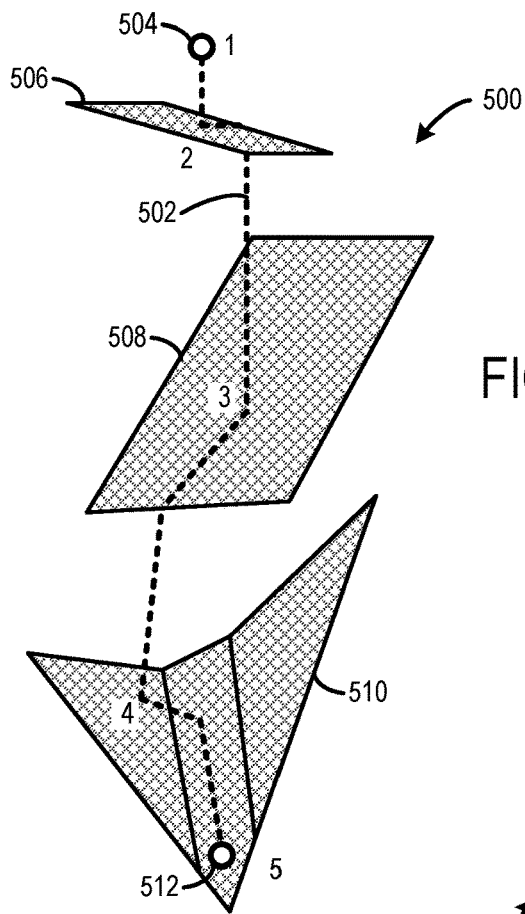
FIG. 5 shows example results of a computer simulation of a movement trajectory of a FOD throughout a geometric computer model having a movement schedule in which the geometric computer model is static.
Figure 6:
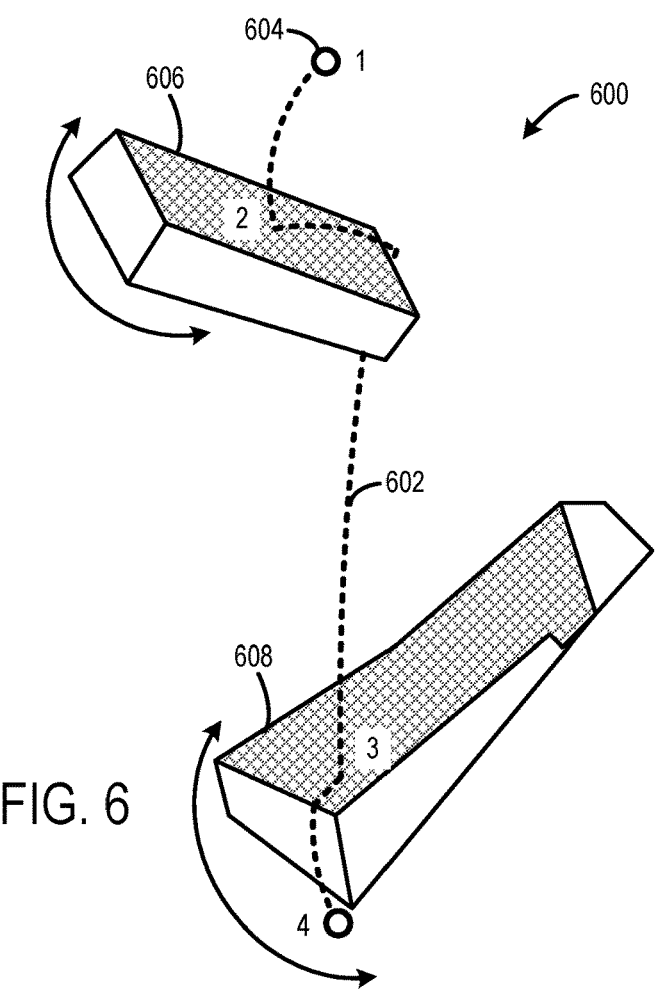
FIG. 6 shows example results of a computer simulation of a movement trajectory of a FOD throughout a geometric computer model having a movement in which surfaces of the geometric computer model have fixed angular acceleration.

FIGS. 5 and 6 show hypothetical movement trajectories of FOD from hypothetical computer simulations based on different movement schedules. The hypothetical movement trajectories of FOD are shown in simplified form for ease of understanding.

In FIG. 5, a geometric computer model 500 has a movement schedule in which the geometric computer model 500 is static. The movement schedule of the geometric computer model 500 produces a movement trajectory 502 of a FOD 504. Initially, the FOD 504 is set to position 1 based on specified initial conditions of the FOD. In this example, the initial velocity of the FOD 504 is set to zero, and gravity is the only force acting on the FOD 504. Next, the FOD 504 falls onto a first shape 506 of the geometric computer model 500. Then, the FOD 504 slides down the first shape 506, falls downward, and collides with a second shape 508 of the geometric computer model 500 at position 3. Then, the FOD 504 continues to slide down the second shape 508 and drops down to a third shape 510 of the geometric computer model 500 at position 4. Finally, the FOD 504 slides down the third shape 510 in a nonlinear motion to a final resting location at position 5. The movement trajectory 502 of the FOD 504 is tracked from the initial location at position 1 to the final resting location at position 5.

In FIG. 6, a geometric computer model 600 has a movement schedule that produces a movement trajectory 602 of a FOD 604. In this case, the movement schedule dictates that a first shape 606 and a second shape 608 of the geometric computer model 600 swing with fixed angular accelerations. Initially, the FOD 604 is set to position 1 based on specified initial conditions of the FOD. The initial velocity of the FOD 604 is set to zero, such that gravity and the rotational forces of the first and second shapes 606 and 608 act upon the FOD 604. Then, the FOD 604 falls onto the first shape 606 of the geometric computer model 600. In this case, the FOD 604 has a curved trajectory from position 1 to the point of impact of the FOD 604 on the first shape 606 at position 2 based on the combined forces of gravity and angular acceleration. Then, the FOD 604 slides down the first shape 606 until the FOD 604 falls, again with a curved trajectory, and impacts the second shape 608 at position 3. Finally, the FOD 604 slides off of the second shape 608 and reaches the position 4 at the end of the movement schedule.

The forces that may be applied to FOD are not restricted to gravity but may include collision or other forces. Note that the FOD dynamics need not be limited to a zero initial velocity condition, nor does the FOD need to be represented as a point particle; it could have a geometric shape and size as well, and additional physics such as spin. Further, rigid body interactions and angular effects could be incorporated into the computer simulation as well, in some examples.

Returning to FIG. 3, in the simplest form of the method 300, behavior of the FOD may be predicted based on a single instance of FOD initial conditions and a single movement schedule. However, in some examples, different FOD behavior scenarios characterized by the different FOD initial conditions and different movement schedules of the machines may be computer simulated to predict general probabilities across multiple FOD forms, multiple starting conditions or cases, and multiple maneuver schedules/physical movements of the machine. The different computer simulations produce simulation data that may be used to inform inspections and prioritize locations where FOD is more likely to be found. Further, such simulation data may be considered to identify improvements in the design and manufacturing of the machine to reduce the likelihood of introducing FOD to the machine.

At 310, the method 300 includes determining if all of the different movement schedules for the current FOD initial conditions have been computer simulated. If all of the different movement schedules for the current FOD initial conditions have been computer simulated, then the method 300 moves to 312. Otherwise, the method 300 returns to 306 and a next movement schedule is recognized for a next computer simulation. The method 300 continues in this manner until all movement schedules have been computer simulated for the current FOD initial conditions.

At 312, the method 300 includes determining if all of the different FOD initial conditions have been computer simulated. If all of the different FOD initial conditions have been computer simulated, then the method 300 moves to 314. Otherwise, the method 300 returns to 304 to recognize next FOD initial conditions for next computer simulations for predicting behavior of the FOD.

In implementations where a plurality of different computer simulations is executed with different instances of FOD initial conditions and/or different movement schedules, at 314, the method 300 optionally may include aggregating simulation data for the plurality of different computer simulations. Such aggregation may include averaging, weighted averaging, and/or other suitable aggregation techniques.

At 316, the method 300 includes outputting simulation data detailing a likelihood that the FOD will come to rest at one or more locations within the geometric computer model of the machine based on the simulated movement trajectory.

In some examples, the simulation data that is output includes the movement trajectory of the FOD itself. For example, the movement trajectory may include a series of points representing the position of the FOD throughout the simulation, or lines connecting these points, as well as associated position/velocity/acceleration/force data at each corresponding time. In some examples, the simulation data includes a final resting location of the FOD.

In other examples, the simulation data details a likelihood that the FOD will come to rest at each of two or more different locations within the geometric computer model of the machine based on the simulated movement trajectory of the FOD. In one example, the movement trajectory of the FOD is used to compute an amount of time spent in proximity to each surface of the geometric computer model of the machine and the likelihood may be based on the amount of time spent in proximity to a given surface/location.

In some implementations where the simulation data details a likelihood that the FOD will come to rest at each of two or more different locations, at 318, the method 300 optionally may include outputting simulation data detailing a likelihood that the FOD will come to rest at two or more different locations that are ordered based on a probability distribution of the highest likelihood to the lowest likelihood. Such a probability distribution may be used to guide efficient searching of locations in an actual machine for FOD inspections relative to an unintelligent brute force FOD inspection approach.

In some implementations, different locations in the geometric computer model of the machine are assigned different weights that influence the likelihood that the FOD will come to rest. In some examples, different locations are weighted such that a likelihood that the FOD will come to rest at a location is increased for a location at an end of the movement trajectory compared to a location before the end of the movement trajectory. In other examples, different locations are weighted the opposite. In particular, the likelihood decreases the further along the movement schedule the FOD is proximate to or collides with a surface/location. For example, if certain physical effects are not known and either ignored or approximated, it may be that the earlier locations in the trajectory have lower approximation error, and approximation error will increase towards the end of the movement trajectory. In this case, location confidence is higher for earlier predicted locations when conditions are known to a greater degree. Weights may be applied to locations using any suitable weighting method. Such weighting methods may include, but are not limited to, mean weighting, and inverse linear distance weighting.

In some implementations where weights are applied to different locations, at 320, the method 300 optionally may include outputting simulation data detailing a likelihood that the FOD will come to rest at each location of the two or more different locations based at least in part on the different weights of the two or more different locations.

The simulation data may be output according to any suitable computer representation or data structure. Further, such simulation data may be processed into a histogram representation, a statistical testing process, or a data aggregation algorithm to determine salient properties of the FOD based on the simulation data. The simulation data may be translated as information that could be printed, logged, visualized, graphed, or otherwise provided back to a user or search crew to inform where a FOD most likely would be under the conditions explored for a real-world version of the machine.

In some implementations, at 322, the method 300 optionally may include outputting a heat map of the geometric computer model of the machine based on the simulation data. The heat map visually indicates different likelihoods that the FOD will come to rest at each of the two or more different locations within the geometric computer model of the machine. Once the simulation data is output the method 300 ends.

Figure 7:
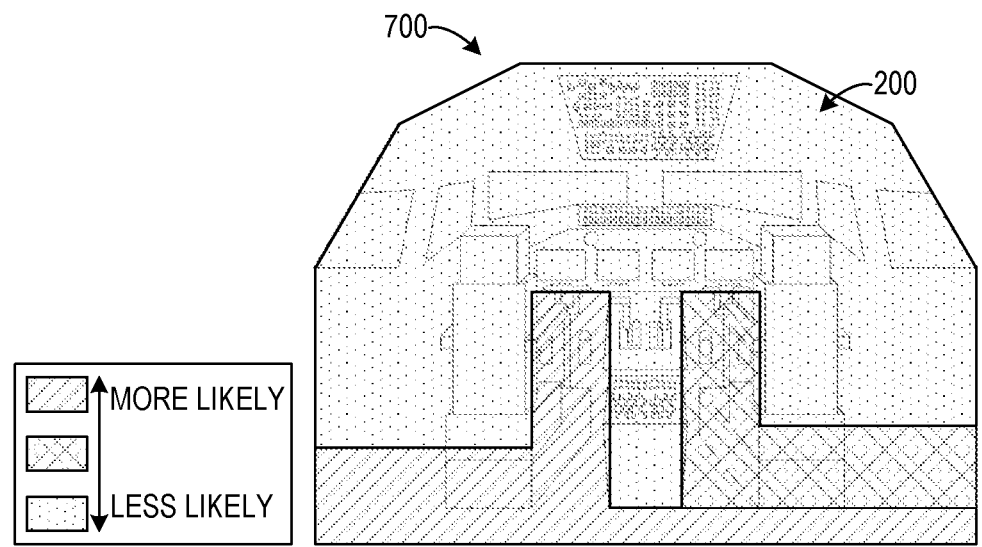
FIG. 7 shows a first example heatmap of a cockpit of an aircraft that visually indicates different likelihoods that FOD will come to rest at different locations within the cockpit based on a first computer simulated movement schedule of the aircraft.
Figure 8:
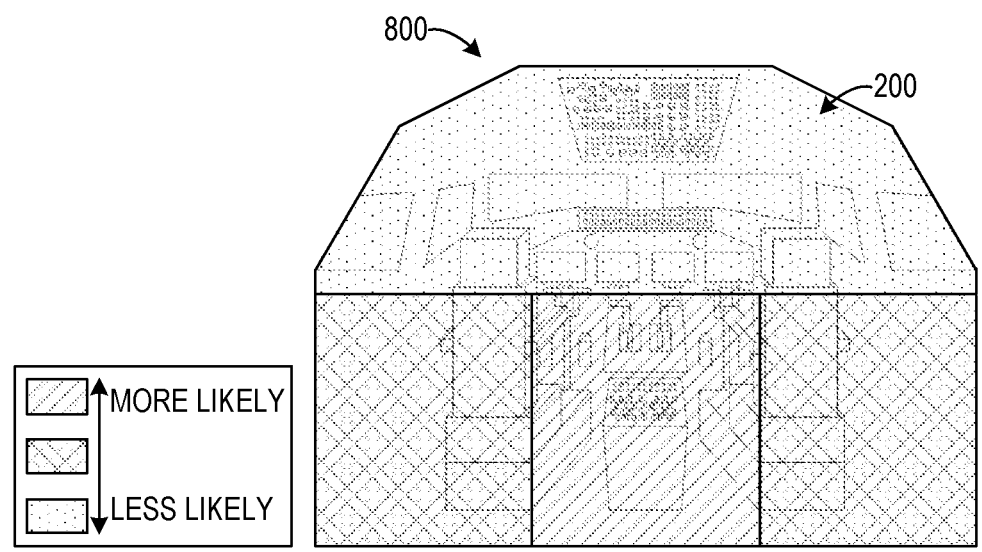
FIG. 8 shows a second example heatmap of a cockpit of an aircraft that visually indicates different likelihoods that FOD will come to rest at different locations within the cockpit based on a second computer simulated movement schedule of the aircraft.

FIGS. 7 and 8 show example heat maps 700 and 800 of the cockpit 200 shown in FIG. 2 of the aircraft 100 shown in FIG. 1 which is an embodiment of a geometric computer model of the machine 10. The heat maps 700 and 800 are generated based on different movement schedules for the aircraft. In FIG. 7, a heatmap 700 of the cockpit 200 visually indicates different likelihoods that FOD will come to rest at different locations within the cockpit 200 based on a first computer simulated movement schedule of the aircraft. In this example, the heat map 700 indicates that the locations having the highest likelihood of having FOD is along the left side of the cockpit 200 and the rear of the cockpit 200 on the floorboards. The heat map 700 further indicates that the right side of the cockpit 200 along the floorboards has the next highest likelihood of having FOD. The heat map 700 indicates that locations along the console and the bulkhead are least likely to have FOD. For example, the heat map 700 may be generated based on the movement schedule of the aircraft including a banked turn to the left that could cause FOD to be more likely to reside on the left side of the cockpit 200.

In FIG. 8, a heatmap 800 of the cockpit 200 visually indicates different likelihoods that FOD will come to rest at different locations within the cockpit 200 based on a second computer simulated movement schedule of the aircraft that differs from the first computer simulated movement schedule of the aircraft. In this example, the heat map 800 indicates that the locations having the highest likelihood of having FOD is centrally located along the floorboards and underneath the console. The heat map 800 further indicates that the right side and left sides of the cockpit 200 along the floorboards have the next highest likelihood of having FOD. The heat map 800 indicates that locations along the console and the bulkhead are least likely to have FOD. For example, the heat map 800 may be generated based on initial conditions of the FOD starting in the center of the cockpit 200 and the movement schedule of the aircraft including no turns, such that the FOD is more likely to reside in the center of the cockpit 200.

The heatmaps 700 and 800 are provided as non-limiting examples. A heatmap may be generated in any suitable manner based on simulation data output based on a computer simulation of a movement trajectory of FOD in a geometric computer model of a machine as discussed herein. The above-described example heatmaps are based on single simulations. In other examples, a heatmap may be produced to show the aggregated likelihoods from a plurality of weighted or non-weighted computer simulations. For example, weighted computer simulations may give more weight in aggregation to more likely initial conditions and/or more likely movement schedules.

The above-described method may be performed to predict behavior of FOD in a machine that may be used for targeted inspection of FOD in a machine that is more time and resource efficient than prior brute force FOD inspection approaches.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other computer resources.

Figure 9:
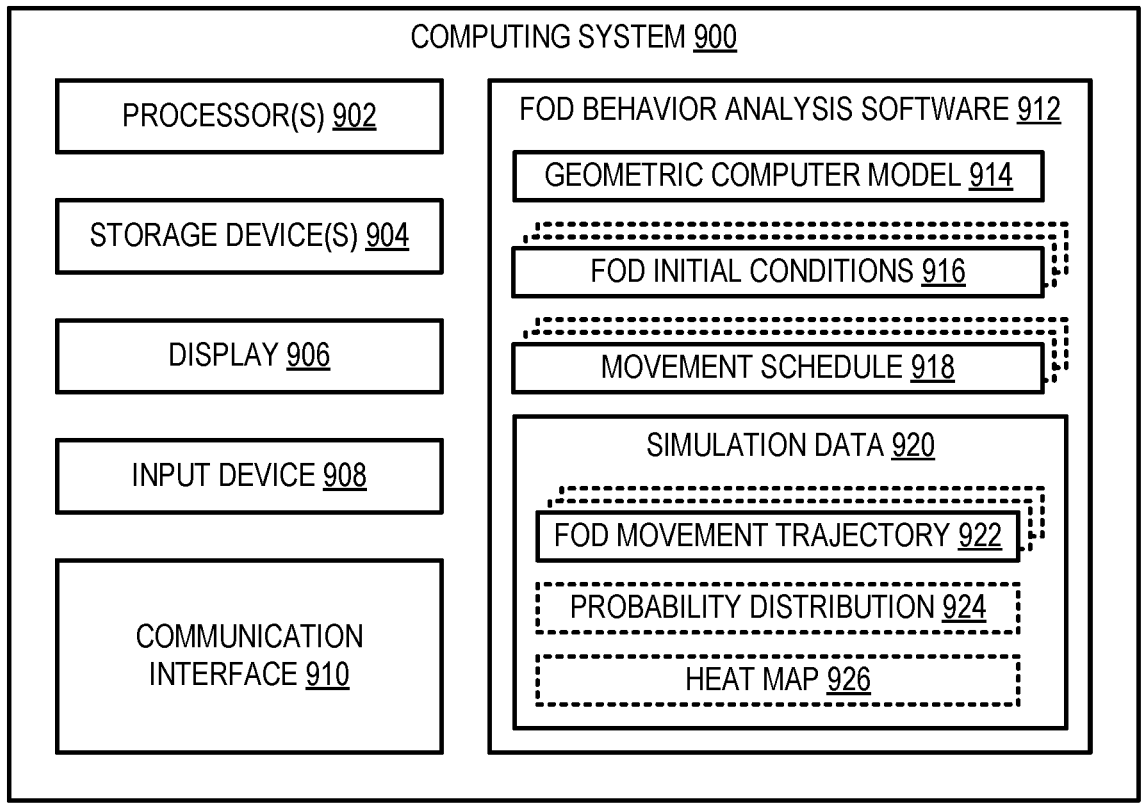
FIG. 9 is a block diagram of an example computing system for enacting the approaches described herein.

FIG. 9 shows an example computing system 900 that is configured to perform efficient separation rules compliance analysis as described-herein. The computing system 900 comprises one or more processors 902, one or more storage devices 904. The computing system 900 includes one or more physical devices. In some examples, the computing system 900 includes a plurality of networked computing devices (e.g., a cluster or cloud computing system). Additionally, the computing system 900 optionally may comprise a display 906, an input device 908, and a communication interface 910.

The one or more processors 902 are configured to execute instructions stored in the one or more storage devices 904. For example, the one or more processors 902 can execute instructions that are part of one or more tools, applications, services, programs, routines, libraries, objects, components, data structures, or other logical constructs. The one or more processors 902 can be configured to execute software instructions. Additionally, or alternatively, the one or more processors 902 can be configured to execute hardware or firmware instructions. The processors 902 can be single-core or multi-core, and the instructions executed thereon can be configured for sequential, parallel, and/or distributed processing.

The one or more processors 902 are communicatively coupled with the one or more storage devices 904. The one or more storage devices 904 may include physical devices that are removable and/or built-in. The one or more storage devices 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The one or more storage devices 904 may include nonvolatile, dynamic, static, read/write, read-only, sequential-access, location-addressable, file-addressable, and/or content-addressable devices. The one or more storage devices 904 may further include physical devices that include random-access memory. The random-access memory may be utilized by the one or more processors 902 to temporarily store information during processing of software instructions.

Aspects of the one or more processors 902 and the one or more storage devices 904 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Any of the FOD behavior analysis described above may be implemented using any suitable combination of state-of-the-art and/or future machine learning (ML), artificial intelligence (AI), and/or other natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, the display 906 can include one or more display devices utilizing virtually any type of technology. Such display devices can be combined with the computing system 900 in a shared enclosure, or such display devices can be peripheral display devices. The display 906 may be configured to visually present one or more aspects a geometric computer model 914 or simulation data 920 for inspection of results of computer simulation of behavior of FOD.

When included, the input device 908 includes or interfaces with one or more devices configured to translate human actions into computer-understandable information. Nonlimiting examples of input devices include a keyboard, mouse, track pad, button, dial, touchscreen, and/or computer interface (e.g., serial or universal serial bus) for interfacing with peripheral input devices. In some embodiments, the input device 908 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or camera for machine vision and/or gesture recognition.

The communication interface 910 is configured to communicate data between the computing system 900 and a remote computing system via a computer network such that the computing system 900 and the remote computing system are communicatively coupled. The communication interface 910 includes wired and/or wireless communication devices compatible with one or more different communication protocols. As non-limiting examples, the communication interface 910 can be configured for communication via a wireless telephone network, or a wired or wireless local- or wide-area network.

The computing system 900 is configured such that the one or more storage devices 904 hold instructions executable by the one or more processors 902 to execute FOD behavior analysis software 912 that is configured to computer simulate behavior of FOD in a geometric computer model 914 representing a machine. In particular, the FOD behavior analysis software 912 is configured to computer simulate a movement trajectory 922 of a FOD from a starting position consistent with FOD initial conditions 916 throughout the geometric computer model 914 of the machine based at least on a movement schedule 918 for the geometric computer model 914 of the machine.

In some examples, the FOD behavior analysis software 912 recognizes a plurality of different FOD initial conditions 916 within the geometric computer model 914 of the machine and recognizes a plurality of different movement schedules 918 for the geometric computer model 914 of the machine. In such examples, the FOD behavior analysis software 912, for each of the plurality of different FOD initial conditions and each of the plurality of different movement schedules, computer simulates a movement trajectory 922 of the FOD from the starting position consistent with the FOD initial conditions 916 throughout the geometric computer model 914 of the machine based at least on the movement schedule 918 for the geometric computer model 914 of the machine.

Further, the FOD behavior analysis software 912 is configured to output simulation data 920 detailing a likelihood that the FOD will come to rest at one or more locations within the geometric computer model 914 of the machine based on the simulated movement trajectory 922. In some examples, the FOD behavior analysis software 912 is configured to output a probability distribution 924 of locations in the machine ordered from the highest likelihood to the lowest likelihood. In some examples, the FOD behavior analysis software 912 is configured to output a heat map 926 of the geometric computer model 914 of the machine based on the simulation data. The heat map 926 visually indicates different likelihoods that the FOD will come to rest at each of the two or more different locations within the geometric computer model 914 of the machine.

In one example, the FOD behavior analysis software 912 is configured to perform the method 300 shown in FIG. 3 and the method 400 shown in FIG. 4 in order to computer simulate behavior of FOD in a machine.

In an example, a computer-implemented method for predicting foreign object debris (FOD) in a machine comprises recognizing a geometric computer model of the machine, recognizing FOD initial conditions within the geometric computer model of the machine, recognizing a movement schedule for the geometric computer model of the machine, computer simulating a movement trajectory of a FOD from a starting position consistent with the FOD initial conditions throughout the geometric computer model of the machine based at least on the movement schedule for the geometric computer model of the machine, and outputting simulation data detailing a likelihood that the FOD will come to rest at a location within the geometric computer model of the machine based on the simulated movement trajectory.

In this example and/or other examples, the simulation data may detail a likelihood that the FOD will come to rest at two or more different locations within the geometric computer model of the machine.

In this example and/or other examples, the likelihood that the FOD will come to rest at a location of the two or more different locations may be proportional to a cumulative duration the movement trajectory of the FOD is within a threshold of the location.

In this example and/or other examples, the likelihood that the FOD will come to rest at a location of the two or more different locations may be increased for a location at an end of the movement trajectory compared to a location before the end of the movement trajectory.

In this example and/or other examples, the two or more different locations may be assigned different weights, and the likelihood that the FOD will come to rest at each location of the two or more different locations may be based at least in part on the different weights of the two or more different locations.

In this example and/or other examples, the two or more different locations may be ordered based on a probability distribution of a highest likelihood to a lowest likelihood that the FOD will come to rest at the two or more different locations.

In this example and/or other examples, the computer-implemented method may further comprise outputting a heat map of the geometric computer model of the machine based on the simulation data, the heat map visually indicating different likelihoods that the FOD will come to rest at the two or more different locations within the geometric computer model of the machine.

In this example and/or other examples, the movement schedule may be generated based on sensor data from actual movement of a corresponding real-world machine.

In this example and/or other examples, the movement trajectory of the FOD may be computer simulated based on a physics engine.

In this example and/or other examples, the movement trajectory of the FOD may be computer simulated based on a machine-learning model previously trained using machine motion training data.

In this example and/or other examples, the FOD initial conditions may include one or more of an initial shape of the FOD, an initial position of the FOD, and an initial velocity of the FOD.

In this example and/or other examples, the FOD initial conditions may be first FOD initial conditions, the computer-implemented method may further comprise recognizing one or more different FOD initial conditions within the geometric computer model of the machine that differ from the first FOD initial conditions, for the one or more different FOD initial conditions, computer simulating a movement trajectory of the FOD from a starting position consistent with the FOD initial conditions throughout the geometric computer model of the machine based at least on the movement schedule for the geometric computer model of the machine, and outputting simulation data detailing a likelihood that the FOD will come to rest at a location within the geometric computer model of the machine based on the simulated movement trajectory.

In this example and/or other examples, the movement schedule may be a first movement schedule, and the computer-implemented method may further comprise recognizing one or more different movement schedules that differ from the first movement schedule, for the one or more different movement schedules, computer simulating a movement trajectory of the FOD from a starting position consistent with the FOD initial conditions throughout the geometric computer model of the machine based at least on the movement schedule for the geometric computer model of the machine, and outputting simulation data detailing a likelihood that the FOD will come to rest at a location within the geometric computer model of the machine based on the simulated movement trajectory.

In another example, a computing system comprises a logic processor, and a storage device holding instructions executable by the logic processor to recognize a geometric computer model of the machine, recognize FOD initial conditions within the geometric computer model of the machine, recognize a movement schedule for the geometric computer model of the machine, computer simulate a movement trajectory of a FOD from a starting position consistent with the FOD initial conditions throughout the geometric computer model of the machine based at least on the movement schedule for the geometric computer model of the machine, and output simulation data detailing a likelihood that the FOD will come to rest at a location within the geometric computer model of the machine based on the simulated movement trajectory.

In this example and/or other examples, the simulation data may detail a likelihood that the FOD will come to rest at two or more different locations within the geometric computer model of the machine.

In this example and/or other examples, the likelihood that the FOD will come to rest at a location of the two or more different locations may be proportional to a cumulative duration the movement trajectory of the FOD is within a threshold of the location.

In this example and/or other examples, the likelihood that the FOD will come to rest at a location of the two or more different locations may be increased for a location at an end of the movement trajectory comparted to a location before the end of the movement trajectory.

In this example and/or other examples, the two or more different locations may be assigned different weights, and the likelihood that the FOD will come to rest at each location of the two or more different locations may be determined based at least in part on the different weights of the two or more different locations.

In this example and/or other examples, the instructions may be executable by the logic processor to output a heat map of the geometric computer model of the machine based on the simulation data, the heat map visually indicating different likelihoods that the FOD will come to rest at the two or more different locations within the geometric computer model of the machine.

In yet another example, a computer-implemented method for predicting foreign object debris (FOD) in a machine comprises recognizing a geometric computer model of the machine, recognizing a plurality of different FOD initial conditions within the geometric computer model of the machine, recognizing a plurality of different movement schedules for the geometric computer model of the machine, for two or more of the plurality of different FOD initial conditions and two or more of the plurality of different movement schedules, computer simulating a movement trajectory of a FOD from a starting position consistent with the FOD initial conditions throughout the geometric computer model of the machine based at least on the movement schedule for the geometric computer model of the machine, and outputting simulation data detailing a likelihood that the FOD will come to rest at a location within the geometric computer model of the machine based on the simulated movement trajectories for two or more of the plurality of different FOD initial conditions and two or more of the plurality of different movement schedules.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A computer-implemented method for predicting foreign object debris (FOD) in a machine, the method comprising:
   recognizing a geometric computer model of the machine;
   recognizing FOD initial conditions within the geometric computer model of the machine;
   recognizing a movement schedule for the geometric computer model of the machine;
   simulating a movement trajectory of a FOD from a starting position consistent with the FOD initial conditions throughout the geometric computer model of the machine based at least on the movement schedule for the geometric computer model of the machine; and
   outputting simulation data detailing a likelihood that the FOD will come to rest at a location within the geometric computer model of the machine based on the simulated movement trajectory.

2. The computer-implemented method of claim 1, wherein the simulation data details a likelihood that the FOD will come to rest at two or more different locations within the geometric computer model of the machine.

3. The computer-implemented method of claim 2, wherein the likelihood that the FOD will come to rest at a location of the two or more different locations is proportional to a cumulative duration the movement trajectory of the FOD is within a threshold of the location.

4. The computer-implemented method of claim 2, wherein the likelihood that the FOD will come to rest at a location of the two or more different locations is increased for a location at an end of the movement trajectory compared to a location before the end of the movement trajectory.

5. The computer-implemented method of claim 2, wherein the two or more different locations are assigned different weights, and wherein the likelihood that the FOD will come to rest at each location of the two or more different locations is based at least in part on the different weights of the two or more different locations.

6. The computer-implemented method of claim 2, wherein the two or more different locations are ordered based on a probability distribution of a highest likelihood to a lowest likelihood that the FOD will come to rest at the two or more different locations.

7. The computer-implemented method of claim 2, further comprising:
   outputting a heat map of the geometric computer model of the machine based on the simulation data, the heat map visually indicating different likelihoods that the FOD will come to rest at the two or more different locations within the geometric computer model of the machine.

8. The computer-implemented method of claim 1, wherein the movement schedule is generated based on sensor data from actual movement of a corresponding real-world machine.

9. The computer-implemented method of claim 1, wherein the movement trajectory of the FOD is computer simulated based on a physics engine.

10. The computer-implemented method of claim 1, wherein the movement trajectory of the FOD is computer simulated based on a machine-learning model previously trained using machine motion training data.

11. The computer-implemented method of claim 1, wherein the FOD initial conditions include one or more of an initial shape of the FOD, an initial position of the FOD, and an initial velocity of the FOD.

12. The computer-implemented method of claim 1, wherein the FOD initial conditions are first FOD initial conditions, wherein the computer-implemented method further comprises:
   recognizing one or more different FOD initial conditions within the geometric computer model of the machine that differ from the first FOD initial conditions;
   for one or more different FOD initial conditions,
      simulating a movement trajectory of the FOD from a starting position consistent with the FOD initial conditions throughout the geometric computer model of the machine based at least on the movement schedule for the geometric computer model of the machine; and
      outputting simulation data detailing a likelihood that the FOD will come to rest at a location within the geometric computer model of the machine based on the simulated movement trajectory.

13. The computer-implemented method of claim 1, wherein the movement schedule is a first movement schedule, and wherein the computer-implemented method further comprises:
  recognizing one or more different movement schedules that differ from the first movement schedule;
  for one or more different movement schedules,
    simulating a movement trajectory of the FOD from a starting position consistent with the FOD initial conditions throughout the geometric computer model of the machine based at least on the movement schedule for the geometric computer model of the machine; and
    outputting simulation data detailing a likelihood that the FOD will come to rest at a location within the geometric computer model of the machine based on the simulated movement trajectory.

14. A computing system comprising:
  a logic processor; and
  a storage device holding instructions executable by the logic processor to:
    recognize a geometric computer model of the machine;
    recognize FOD initial conditions within the geometric computer model of the machine;
    recognize a movement schedule for the geometric computer model of the machine;
    simulate a movement trajectory of a FOD from a starting position consistent with the FOD initial conditions throughout the geometric computer model of the machine based at least on the movement schedule for the geometric computer model of the machine; and
    output simulation data detailing a likelihood that the FOD will come to rest at a location within the geometric computer model of the machine based on the simulated movement trajectory.

15. The computing system of claim 14, wherein the simulation data details a likelihood that the FOD will come to rest at two or more different locations within the geometric computer model of the machine.

16. The computing system of claim 15, wherein the likelihood that the FOD will come to rest at a location of the two or more different locations is proportional to a cumulative duration the movement trajectory of the FOD is within a threshold of the location.

17. The computing system of claim 15, wherein the likelihood that the FOD will come to rest at a location of the two or more different locations is increased for a location at an end of the movement trajectory compared to a location before the end of the movement trajectory.

18. The computing system of claim 15, wherein the two or more different locations are assigned different weights, and wherein the likelihood that the FOD will come to rest at each location of the two or more different locations is determined based at least in part on the different weights of the two or more different locations.

19. The computing system of claim 14, wherein the instructions are executable by the logic processor to output a heat map of the geometric computer model of the machine based on the simulation data, the heat map visually indicating different likelihoods that the FOD will come to rest at the two or more different locations within the geometric computer model of the machine.

20. A computer-implemented method for predicting foreign object debris (FOD) in a machine, the method comprising:
  recognizing a geometric computer model of the machine;
  recognizing a plurality of different FOD initial conditions within the geometric computer model of the machine;
  recognizing a plurality of different movement schedules for the geometric computer model of the machine;
  for two or more of the plurality of different FOD initial conditions and two or more of the plurality of different movement schedules,
    simulating a movement trajectory of a FOD from a starting position consistent with the FOD initial conditions throughout the geometric computer model of the machine based at least on the movement schedule for the geometric computer model of the machine; and
  outputting simulation data detailing a likelihood that the FOD will come to rest at a location within the geometric computer model of the machine based on the simulated movement trajectories for the two or more of the plurality of different FOD initial conditions and the two or more of the plurality of different movement schedules.

* * * * *